US007490117B2

(12) United States Patent
Subramoney et al.

(10) Patent No.: US 7,490,117 B2
(45) Date of Patent: Feb. 10, 2009

(54) DYNAMIC PERFORMANCE MONITORING-BASED APPROACH TO MEMORY MANAGEMENT

(75) Inventors: Sreenivas Subramoney, Palo Alto, CA (US); Richard Hudson, Florence, MA (US); Mauricio Serrano, San Jose, CA (US); Ali-Reza Adl-Tabatabai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 10/749,425

(22) Filed: Dec. 31, 2003

(65) Prior Publication Data

US 2006/0143421 A1    Jun. 29, 2006

(51) Int. Cl.
  *G06F 12/08* (2006.01)
(52) U.S. Cl. .................. 707/206; 711/170; 711/173
(58) Field of Classification Search .................. None
  See application file for complete search history.

(56) References Cited

U.S. PATENT DOCUMENTS

| | | | | |
|---|---|---|---|---|
| 5,799,324 | A * | 8/1998 | McNutt et al. | 707/206 |
| 6,393,522 | B1 | 5/2002 | Campbell | |
| 6,622,300 | B1 | 9/2003 | Krishnaswamy et al. | |
| 6,629,170 | B1 | 9/2003 | Davidson et al. | |
| 6,732,357 | B1 * | 5/2004 | Berry et al. | 717/158 |
| 7,174,354 | B2 * | 2/2007 | Andreasson | 707/206 |

OTHER PUBLICATIONS

Chilimbi, et al., "Using Generational Garbage Collection to Implement Cache-Conscious Data Placement," *International Symposium on Memory Management (ISMM)* (1998).

Chilimbi, et al., "Cache-Conscious Structure Definition," *Proceedings of the ACM SIGPLAN* (1999).
Chilimbi, et al., "Cache-Conscious Structure Layout," *Proceedings of the ACM SIGPLAN* (1999).
Jones, et al., "Garbage Collection—Algorithms for Automatic Dynamic Memory Management," pp. 220-223 (1996).
Clarke, et al., "Compacting Garbage Collection can be Fast and Simple," Software-Practice and Experience 26(2):177-194 (1996).
Delacour, "Allocation Regions & Implementation Contracts," Memory Management, International Workshop Iwmm. Proceedings pp. 426-439 (1992).
International Search Report issued in PCT/US04/043349 mailed on Jun. 1, 2005.
Written Opinion issued in PCT/US04/043349 mailed on Jun. 1, 2005.

* cited by examiner

*Primary Examiner*—Gary J Portka
(74) *Attorney, Agent, or Firm*—Marshall, Gerstein & Borun LLP

(57) ABSTRACT

Techniques are described for optimizing memory management in a processor system. The techniques may be implemented on processors that include on-chip performance monitoring and on systems where an external performance monitor is coupled to a processor. Processors that include a Performance Monitoring Unit (PMU) are examples. The PMU may store data on read and write cache misses, as well as data on translation lookaside buffer (TLB) misses. The data from the PMU is used to determine if any memory regions within a memory heap are delinquent memory regions, i.e., regions exhibiting high numbers of memory problems or stalls. If delinquent memory regions are found, the memory manager, such as a garbage collection routine, can efficiently optimize memory performance as well as the mutators performance by improving the layout of objects in the heap. In this way, memory management routines may be focused based on dynamic and real-time memory performance data.

13 Claims, 6 Drawing Sheets

DYNAMIC PERFORMANCE MONITORING-BASED APPROACH TO MEMORY MANAGEMENT

FIELD OF THE DISCLOSURE

The disclosure generally relates to memory management in a processor-based system and, more particularly, to apparatuses and techniques for optimizing memory management.

BACKGROUND OF THE RELATED ART

A well-known performance gap exists between microprocessor speed and memory performance. Microprocessor clock speeds double every few years, while memory speeds may hardly improve. A microprocessor might operate at GHz clock speeds, while the random access memory (RAM) used by that microprocessor has clock speeds an order of magnitude slower, at least. Consumers can intuitively appreciate that the performance gap affects mass storage memory, like hard drives and CD-ROM storage, but the gap affects faster memories like RAM and cache, as well. And the performance gap is not only from clock speed, but also from latency problems and memory stalls.

Computer systems use multiple memory levels to address the performance gap. Each level is closer to the registers and can provide the registers with data with decreasing latency. Level 1 memory is a relatively small and very fast memory, typically found on a microprocessor chip, that stores low level instructions and data. Level 2 cache memory is a larger memory that may also be found on the microprocessor. More levels of cache memory are also possible. These memories are typically much smaller than RAM, but much faster.

Unfortunately, Level 1 and Level 2 cache memories are plagued with latency problems and memory stalls waiting for memory from RAM. Larger cache memories, for example, experience greater read and write latencies, greater data translation look aside buffer (DLTB) misses, and greater cache miss information. The DTLB is coupled to a cache and used to assist in locating data in higher levels of memory, such as the cache.

Various techniques have been developed to improve memory performance. Examples include prefetching data, multithreading code, dynamic instruction scheduling, speculative code execution, and cache-conscious data placement. These solutions attempt to address the memory latency problems. Other solutions attempt to address memory allocation problems. Garbage collection algorithms, for example, have been designed to reclaim unused memory regions within a heap and organize existing memory objects in a more efficient manner. More importantly, they relieve the programmer of managing the reclamation of unused memory.

There are a number of garbage collection techniques, e.g., copy garbage collection, mark-sweep garbage collection, generational garbage collection, and sliding compaction. Sliding compaction is a popular garbage collection technique in which live memory objects are rewritten over the dead spaces in the memory heap, retaining the allocation order. The technique is particularly useful for object-oriented applications such as those written in C#, or Java, as well as for frameworks like the various .Net frameworks (originally developed by Microsoft Corporation of Redmond, Wash.) used in server-based environments.

Garbage collection schemes search the memory heap for areas that are unreachable and therefore reusable. Garbage collectors that fragment memory by limiting where an object can be allocated harm object allocation times and may lead to greater DTLB misses. With sliding compaction, the number of DTLB entries needed to support the working set of the code is reduced because the live objects in the managed heap are brought closer together. A useful characteristic of sliding compaction is that it does not disturb and thus maintains the spatial order in which the objects were originally placed before sliding compaction commenced while also eliminating intervening dead spaces. Thus, spatial locality is actually improved due to in-place compression. Fewer CPU stalls result because of fewer DTLB misses, and code speed is enhanced. Also cache misses may be reduced, because of the reduction in dead spaces.

Yet, despite its performance advantages, sliding compaction is quite expensive in comparison to some other garbage collection routines imposing significant space and time overheads on all phases of garbage collection. These problems are exacerbated with large heap sizes. Even, incremental sliding compaction, i.e., sliding only a portion of the heap during a given garbage collection cycle, is unable to get to the problem areas quickly enough, as many memory regions must wait numerous collection cycles before being managed.

In the end, memory latency and stalls place a high tax on current memory management techniques. The amount of time software code expends on memory management, no matter the technique, is great. Identifying problematic memory regions must be done each time a code is executed and reclamation of the memory spaces within these problematic regions, especially for larger heaps, is too imprecise for efficient code implementation.

DETAILED DESCRIPTION OF AN EXAMPLE

Various techniques are described for optimizing memory management within a processor system. By focusing the work performed by memory management, the execution of application code, i.e., mutators, in dynamic managed runtime environments like Java and .Net environments running on the processor system may be improved. The techniques may be implemented on processors or processor architectures capable of performance monitoring by using hardware monitoring. Sample microprocessors included Pentium® 4 (Precise Event Based Sampling) and Itanium® processors (Performance Monitoring Unit) available from Intel Corporation of Santa Clara, Calif. The techniques may be implemented into dedicated processor environments, as well, of which the input/output (I/O) processors used in storage, networking and embedded applications are examples. In I/O applications, e.g., servers, workstations, and storage subsystems, the techniques may be realized to optimize memory management across a network of devices to optimize code execution and data flow. Examples include the i960® RM/RN/RS I/O processor and the IOP331 I/O processor built with a XScale™ core microarchitecture, both available from Intel Corporation. Persons of ordinary skill in the art will appreciate that these processors are examples and that the techniques described may be implemented on other processors.

Figure 1:
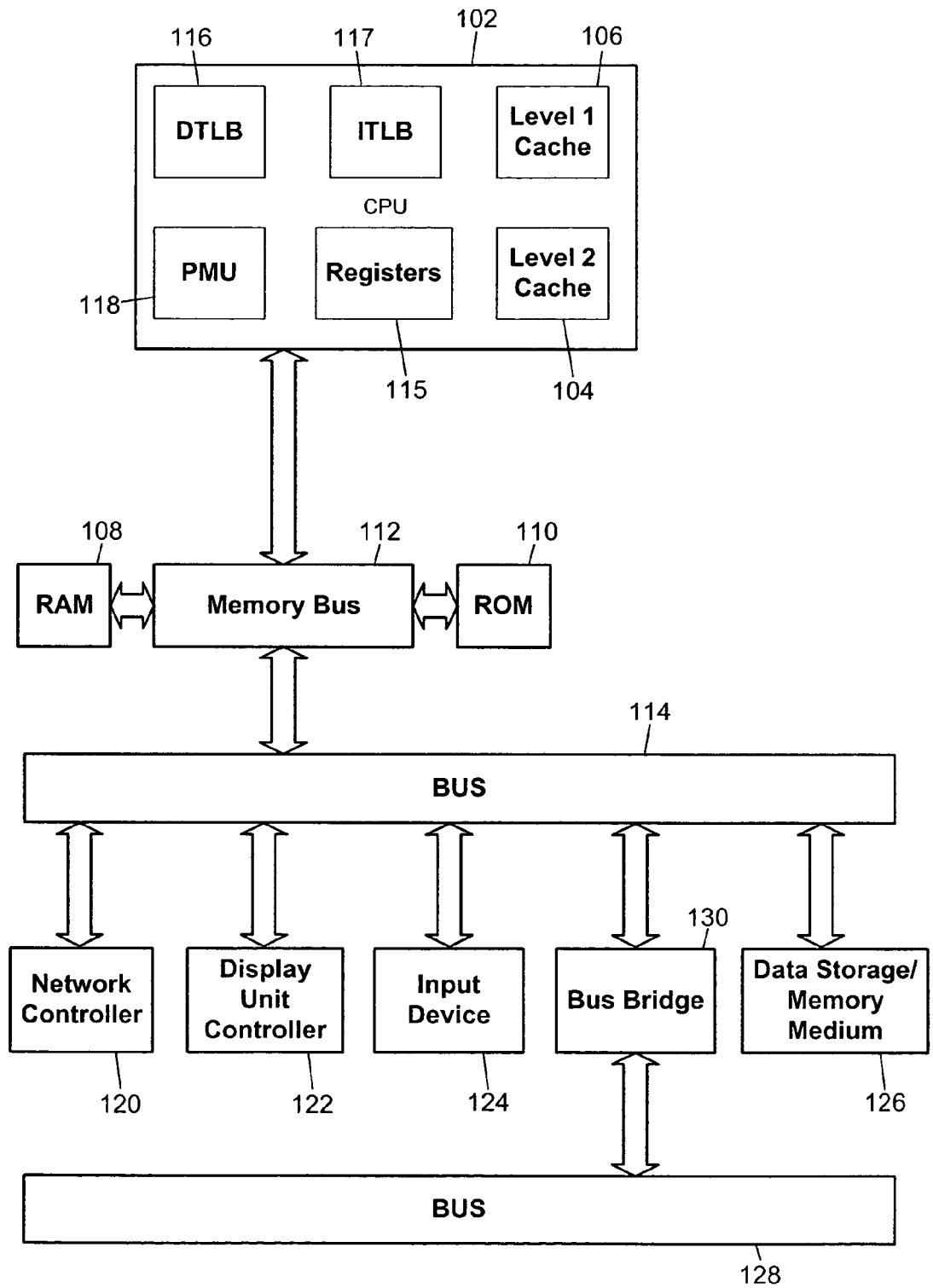
FIG. 1 illustrates a block diagram of a central processing unit (CPU) and memory controller, CPU having a memory performance monitor.

FIG. 1 illustrates an example computer system 100 that includes a CPU unit 102 having a Level 2 cache 104 and a Level 1 cache 106. The CPU 102 is coupled to a RAM 108 and a read only memory (ROM) 110, via a memory bus 112. In the illustrated example, the memory bus 112 is coupled to a system bus 114. Alternatively, the memory bus 112 may be a system bus. Persons of ordinary skill in the art will appreciate that the illustrated configuration is by way of example only.

The CPU 102 may include a discrete arithmetic logic unit (ALU), registers, and control unit all connected together. Or, as shown, the CPU 102 may be an integrated microprocessor. The CPU 102 includes registers block 115. The block 106 may include a data cache, an execution cache, and an instruction cache running at processor speeds. The Level 2 cache 104 may be a known cache memory and may include a cache interface that transfers data on each clock cycle. Level 2 cache may reside either on the CPU chip (box 102) or separately and coupled thereto via a CPU bus.

The CPU 101 also includes a data translation lookaside buffer (DTLB) 116 and an instruction translation lookaside buffer (ITLB) 117.

The CPU 102 also includes a performance monitoring unit (PMU) 118 that may be on the CPU chip as shown or coupled thereto. Suitable microprocessors offering on-chip PMUs include Pentium® 4 and Itanium® processors. The CPU 102 may represent any processor or process architecture (e.g., one with an off-chip PMU) capable of performance monitoring.

The system bus 114 is coupled to a network controller 120, a display unit controller 122, an input device 124, and a data storage/memory medium 126, e.g., a mass storage device. Examples of the various devices coupled to the bus 106 are known. In the illustrated example, the bus 106 is coupled to another bus 128 via a bus bridge 130.

The operating system executing on processor 102 may be one of a variety of systems, for example, one of the WINDOWS family of systems available from Microsoft Corporation of Redmond, Wash., such as WINDOWS 95, 98, 2000, ME, or XP. Alternatively, the operating system may be one of the UNIX* family of systems, originally developed by Bell Labs (now Lucent Technologies Inc./Bell Labs Innovations) of Murray Hill, N.J. and available from various sources. As a further alternative, the operating system may be an open-source system, such as the LINUX operating system. It will be recognized that still further alternative operating systems may be used.

The processor 102 executes memory management code, e.g., garbage collections routines, based on data from the PMU 118. The code may be used for both memory reclamation and initial allocation. There are many different garbage collection routines. For example, a reference counting garbage collection program may keep track of the number of references to a particular memory region (e.g., block), and may release the memory region when there are no references to the memory location. A mark-and-sweep garbage collection program may trace the objects reachable from the roots of the then-operating threads, and may mark the objects that are reachable. The mark-and-sweep garbage collection program may then review all of the objects and release the memory regions used by objects that are unmarked (i.e., no longer reachable from the root of one of the operating threads). A copying garbage collection program may divide the memory heap available into two sections, or spaces, and at certain times may move those objects that are reachable (transitively from the roots of the application threads) from the space presently in use (the "From Space") to the space that is presently not in use (the "To Space"). The application threads allocate objects in the "To Space" until it is full. At this time, the copying garbage collection program then reclaims the "From Space" by reversing the roles of the two spaces, i.e., the old "From Space" becomes the new "To Space" and the old "To Space" becomes the new "From Space".

As a still further alternative, a generational garbage collection program focuses on a section of the memory heap where most of the recent allocations of memory have been made. It moves those objects within the focus area that are reachable from outside the focus area to a new area. To keep track of the objects that are reachable from outside the focus area, the generational garbage collection program may use a write barrier and a log, which may be in the form of a store buffer. The write barrier checks all writes to determine if an object from outside of the focus area is making reference to an object within the focus area. If a reference is being made from an object outside the focus area to an object within the focus area, this reference is recorded in the log. The garbage collection program may then review the log at the time of memory reclamation and reallocation to determine which objects within the focus area are to be moved to the new area. The log can be encoded as a card table or as a hash table or as a simple sequential buffer.

Another example garbage collection routine is the sliding compaction generally described above. Still other known techniques include beltway collection, oldest first collection, and hybrid collection which may combine any number of the garbage collection routines listed above. Oldest first collectors focus collection on the oldest objects in the system instead of the youngest as is typical of generational collectors. Beltway collectors use a round robin approach to look for areas with a high death rate. When one is found it focuses collection activity in this area. The collectors may be concurrent or incremental. By concurrent we mean they operate concurrently with the application code. By incremental we mean they collect only a portion of the dead object during each GC cycle.

Figure 2:
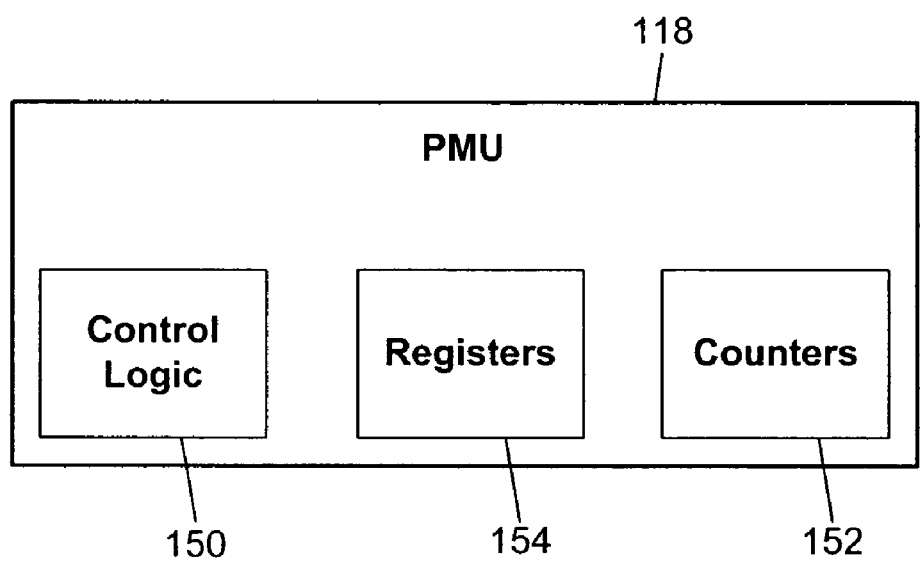
FIG. 2 illustrates the memory performance monitor of FIG. 1 in greater detail.

Unlike convention garbage collection routines, the system 100 relies up data from the PMU 118 to focus garbage collection. FIG. 2 illustrates the PMU 118 in greater detail. The PMU 118 includes control logic 150, counters 152, and registers 154. The PMU 118 may be on-chip hardware that monitors discrete events during code execution. The counters 152 may include global time stamp counters and dedicated programmable event counters capable of monitoring memory performance, such as DTLB counters that track the DTLB misses and the memory reference that caused the DTLB miss. Dedicated programmable event counters may monitor events in the Level 1 and Level 2 memories 116 and 104, as well as events in any DTLB. The PMU 118 may be expanded to monitor events in the RAM 108 and/or mass storage memories, via the memory bus 112 or the system bus 114. In network systems, the PMU 118 may provide monitored data remotely, for example, via the network controller 120.

The PMU 118 may monitor any memory performance event. Example events include instruction cache misses, data cache misses, branch mis-predicts, ITLB misses, DTLB misses, stalls due to data dependency, and data cache writeback.

The events monitored may be identified by the event registers 154, which control the counters 152 to incrementally monitor desired memory performance events. Each register within the registers block 154 may control a number of counters within the counters block 152. By way of example only, 32 bit-counters and 32-bit or 64-bit registers may be used, respectively.

The PMU 118 monitors the entire memory system associated with the processor 102 and may count events identified in the control registers 154. Events can occur upon execution of various code instructions and include read and write attempts to the cache 104 or a DTLB. With object-oriented languages like those mentioned above, as well as environments like .Net, stored objects may be associated with other stored objects and may be usable by other code. Associated stored objects may have temporal locality—e.g., the objects may be accessed by code in immediate succession—thereby making spatial locality within the heap desirable. The PMU 118 may monitor memory performance events to assist the memory manager in achieving such spatial locality. The PMU 118 may monitor multiple events concurrently so that different memory events are counted simultaneously.

PMUs may function in different ways depending on processor implementation, but in an example implementation, the PMU 118 includes counters that count events such as data cache or DTLB misses and instruction cache or ITLB misses. The PMU 118 includes memory buffers for storing historical data indicating the number of such misses attributable to a particular memory region. The PMU 118 or external code may control the size of the monitored memory regions. The data monitored by the PMU 118 may be performance data on memory regions the size of an individual memory block or larger. Memory regions may be 64K in size, by way of example.

The PMU 118 may be programmed to identify events as they occur. Alternatively, the PMU 118 can be set to interrupt monitoring temporarily and output monitored data when the amount of data associated with a memory region has reached a threshold. The threshold may be determined by code, set based on past PMU monitoring samples, or set during monitoring, for example, by comparing the buffered historical data for one monitored event against the buffered historical data of another monitored event. Upon detection of a memory region having a threshold value of memory events, the PMU 118 determines that the memory region is a delinquent memory region. The PMU 118 may be programmed to interrupt monitoring and output an identifier for that memory region for subsequent memory management. The system 100 may alternatively determine that a memory region is a delinquent region via code external to the PMU 118 based on monitoring data from the PMU 118. The PMU 118 may be used with a stop the world or a concurrent garbage collection, the latter case allowing the garbage collector to operate concurrently with code, i.e., mutator, execution.

Figure 3:
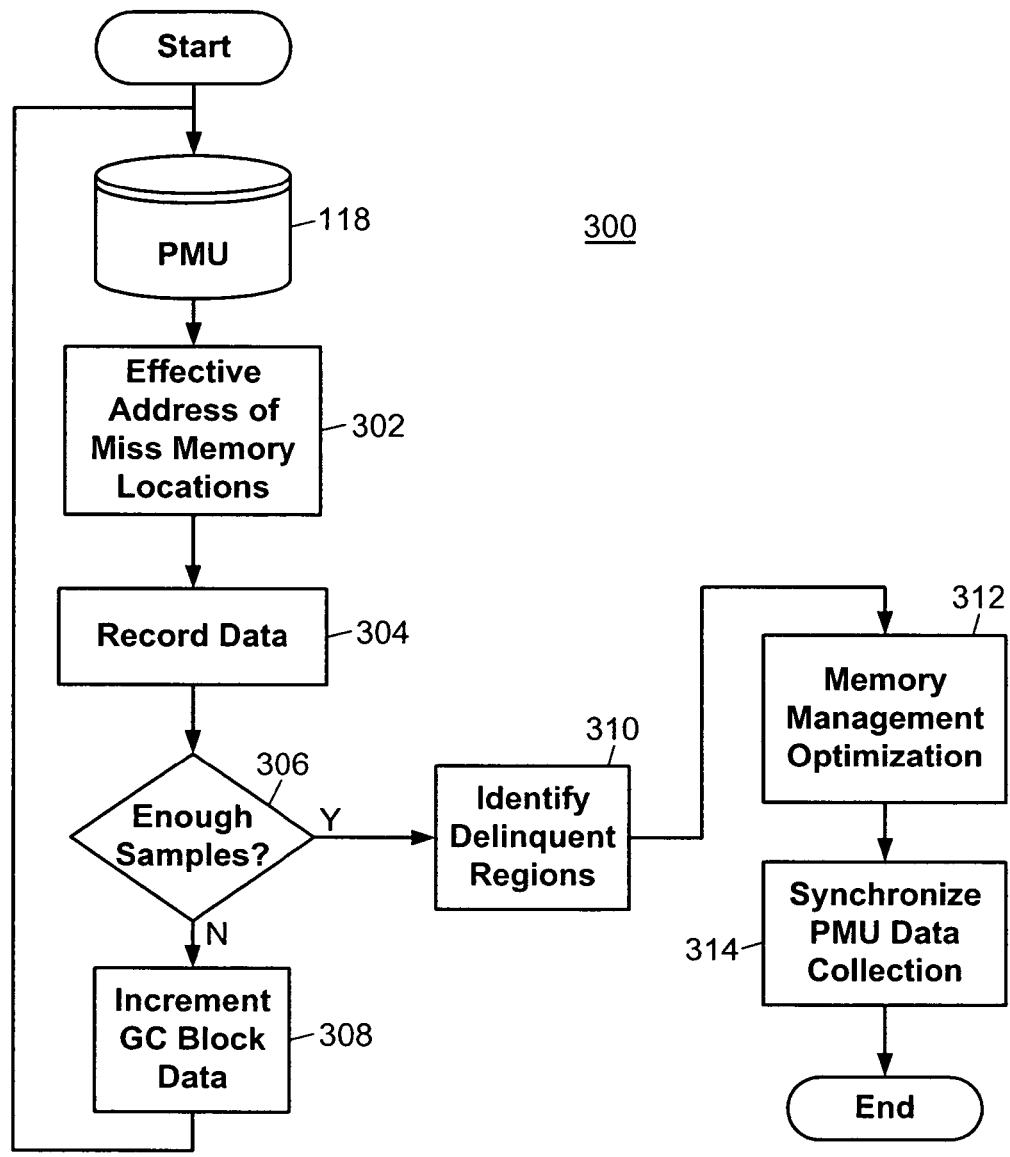
FIG. 3 illustrates a flow diagram of an example memory management optimization.

FIG. 3 illustrates an example process 300 for using the PMU 118 to inform memory management. The process 300 may be implemented by software stored and executed on the system 100. In the illustrated example, the process 300 executes various software routines or steps described by reference to blocks 302-314.

The PMU 118 monitors memory operations in the Level 1 cache 106, the Level 2 cache 104, DTLB 116 and ITLB 117 and delivers monitored information to an effective address block 302 that identifies an effective address for each high latency load miss, whether a cache miss or a DTLB miss. A high latency miss is one that requires the data to be fetched from main memory or RAM. A cache load miss effective address is a memory object that is not represented in the cache. The block 302 provides the load miss effective address to a record data block 304 that maintains a frequency count for each memory region. The counters 152 or other storage medium such as the RAM 108 or mass storage may implement the block 304. The memory regions may have any desired granularity, for example, 64K. The block 304 passes control to a decision block 306 that determines if enough data samples from the PMU 118 have been provided so that delinquent regions may be identified and memory management code may be executed.

If enough samples have not been taken, control passes to an incrementing block 308, which stores the total number of PMU samples taken. Control is passed back to the PMU 118 for further monitoring of memory performance data. If the block 306 determines that enough data samples have been collected, for example, if a desired sample count value is stored at block 308, then the historical data from block 304 is provided to a block 310 that identifies any delinquent regions with the memory heap. The block 310, for example, may identify the region(s) of the memory heap where 90% of the identified cache or DTLB misses occur and mark the region(s) as delinquent. The block 310 may identify multiple delinquent regions by separating the memory heap into sections before determining where the threshold miss locations are concentrated for each section. Delinquent region granularity may be set by the block 310 and may be equal to or different than the size of the memory region originally monitored. That is, a delinquent region may include numerous memory regions having miss locations.

The identified delinquent regions are provided to a memory management block 312 for heap optimization. The block 312 may perform one or more garbage collection routines, such as any of those described hereinabove. The routines may be performed on delinquent regions only or on both delinquent and non-delinquent regions. For example, the memory management block 312 may apply the default garbage collection algorithm on the non-delinquent memory regions of the memory heap and a sliding compaction on the delinquent regions only, i.e., the regions that exhibit disproportionately higher memory stalls. Thus, the process 300 may apply a first memory management routine to a delinquent region, or multiple delinquent regions, and a second, different memory management routine on a non-delinquent region, or multiple non-delinquent regions. In each of these examples, the sliding compaction garbage collector may be directed to the most problematic areas of the heap. We will now explain what infrastructure may be used to support sliding compaction.

During the mark phase of garbage collection at the block 312, all live objects are marked. Also, in order to support sliding compaction in a subsequent phase, memory objects in the heap that point into the compaction region, e.g., the delinquent region, are also noted. As a result, during sliding compaction, all compaction blocks are processed and their memory objects are compacted together. After execution of the memory manager 312, a block 314 synchronizes PMU data collection. Such synchronization is done so that further collection of PMU data will be relative to the current heap configuration. Previous samples are discarded as part of this synchronization.

Although the blocks 302, 304, 306, 308, and 310 are shown separately, they may be executed by PMU 118.

Figure 4:
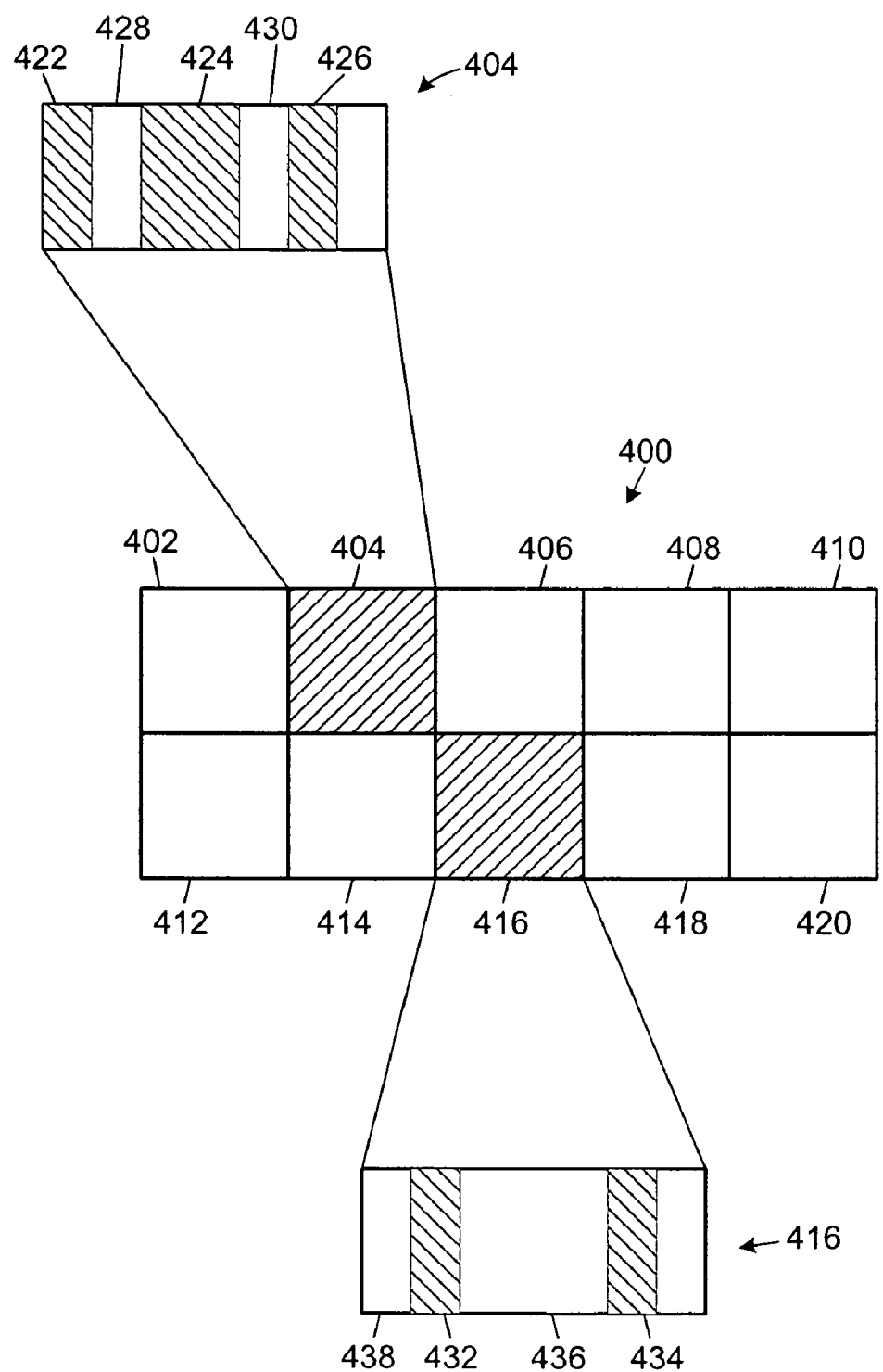
FIG. 4 illustrates a memory heap that has two delinquent regions.

FIG. 4 illustrates a sample memory heap 400 formed of a plurality of memory regions 402-420. The number of memory regions is provided for illustrative purposes only. The memory regions 404 and 416 have been identified by the block 310 as delinquent regions (indicated by the cross shading) because they have experienced a threshold number or percentage of load misses for the heap 400. An example state of the memory region 404 is shown in greater detail. Memory objects 422, 424, and 426 are spaced apart by dead spaces 428 and 430 in the memory region 404. The memory region 416 includes two memory objects 432 and 434, separated by a dead space 436. Both memory objects are spaced from a leading edge of the memory region 416 by a dead space 438.

Figure 5:
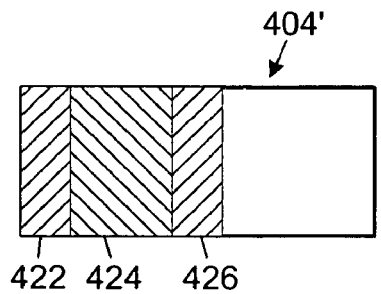
FIG. 5 illustrates an example optimization of one delinquent region of FIG. 4.
Figure 6:
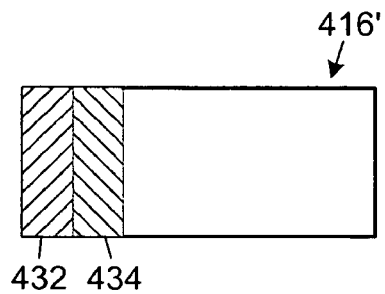
FIG. 6 illustrates an example optimization of another delinquent region of FIG. 4.
Figure 7:
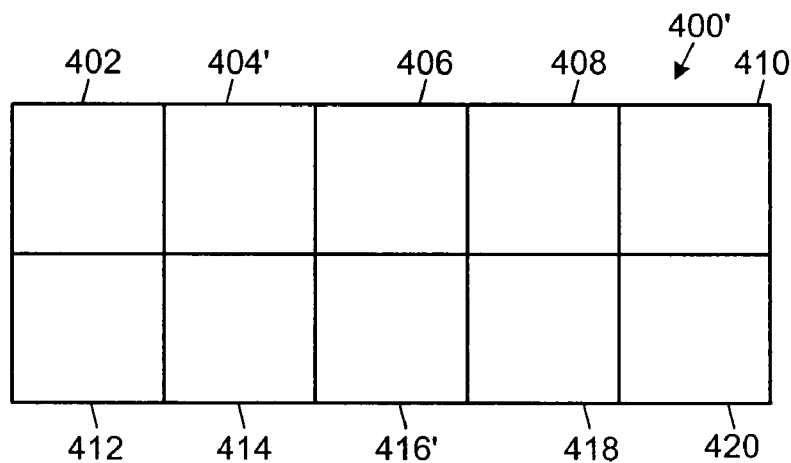
FIG. 7 illustrates the memory heap of FIG. 4 after delinquent region optimization.
Figure 8:
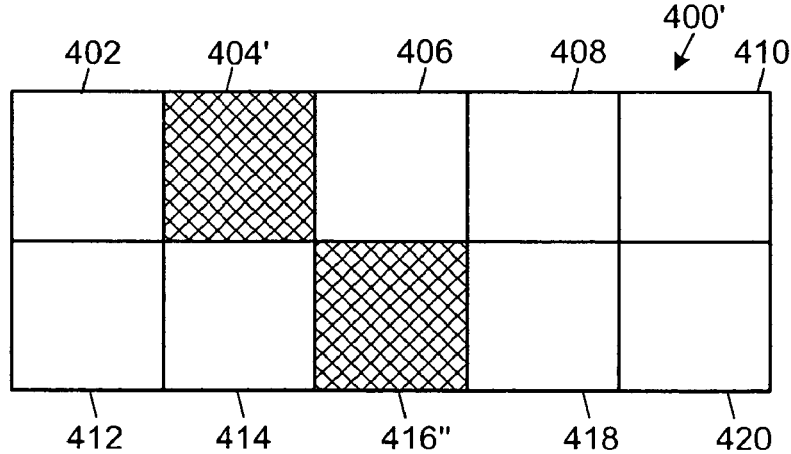
FIG. 8 illustrates the memory heap of FIG. 4 after another delinquent region optimization.

The delinquent regions 404 and 416 are identified to the block 312 which may perform a garbage collection on these regions only, without affecting regions 402, 406, 408, 410, 412, 414, 418, and 420. FIG. 5 shows a resultant, optimized memory region 404' after a sliding compaction has been executed. FIG. 6 shows a resultant, optimized memory region 416' after a sliding compaction has been executed. The resulting memory heap 400' (FIG. 7) shows that all memory regions are optimized (i.e., no cross-shading). Although sliding compaction is illustrated, other garbage collection routines may be executed on delinquent regions 404 and 416. Selective and conscious application of sliding compaction to only such delinquent regions in order to improve subsequent memory performance may thus be achieved. Alternatively, garbage collection may be executed over the entire heap 400, with or without a unique garbage collection routine (e.g., sliding compaction) being executed on the specific delinquent regions 404 and 416. Additionally, in an alternative embodiment, the delinquent regions may be temporarily blocked from memory storage, as indicated by blocked regions 404" and 416" in FIG. 8.

Figure 9:
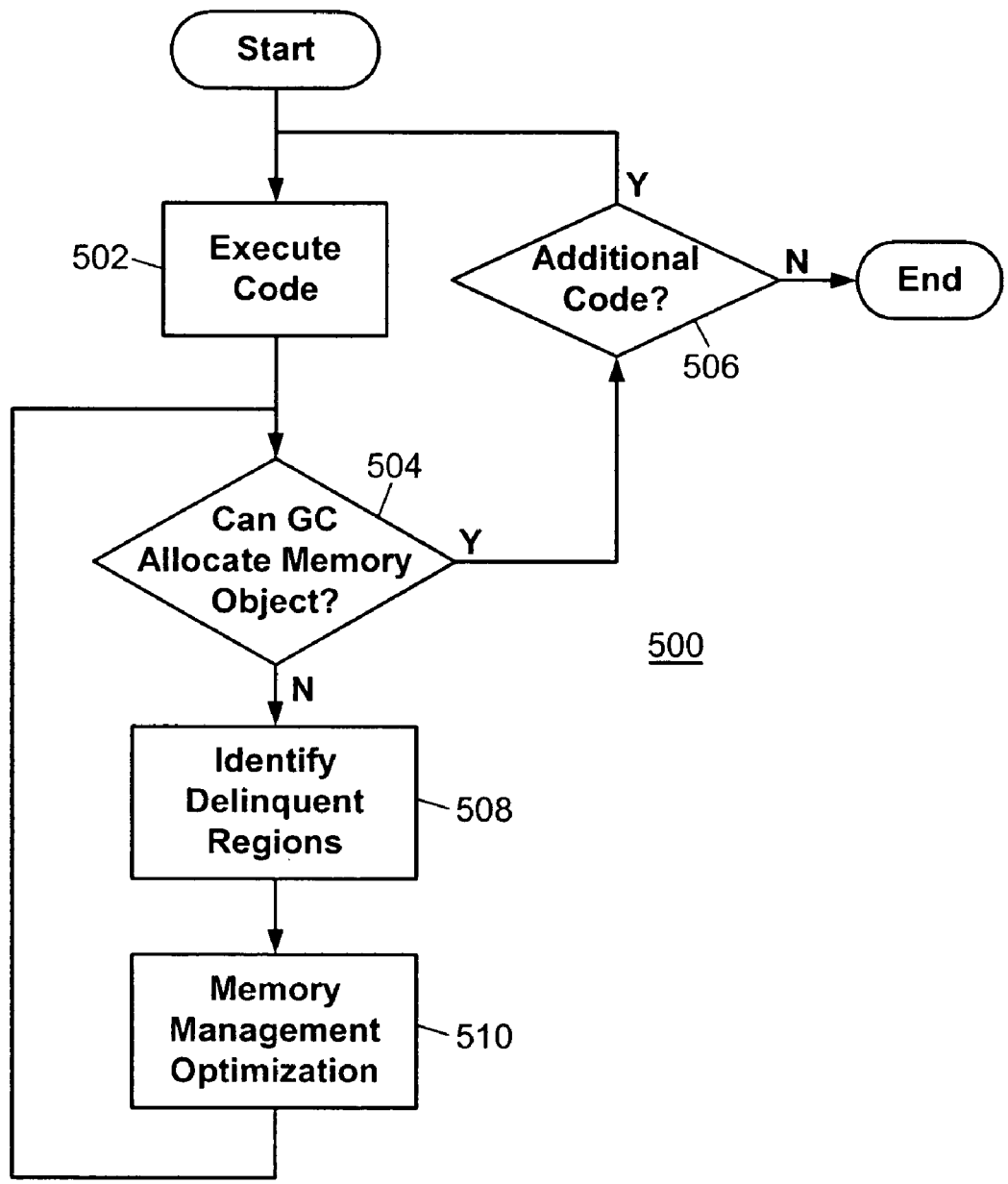
FIG. 9 illustrates a flow diagram of a sample code execution.

FIG. 9 illustrates an example process 500 executing code on the system 100. The process 500 may be implemented by software stored and executed on the system 100. In the illustrated example, the process 500 executes various software routines or steps described by reference to blocks 502-510.

A block 502 executes application code, also termed a mutator, on the CPU 102. Example code languages include C#, and JAVA, although, code is not limited to these languages. The code may be written under a Net framework as well. The code may be an operating system or an application executed over the operating system.

The block 502 passes control to a decision block 504 that determines if a memory manager can allocate a new memory object for the executing code onto the heap of the system 100. If the block 504 determines that the answer is yes, control is passed to a decision block 506 that determines if additional code is to be executed. If the block 504 determines that the answer is no, then-control is passed to block 508 that performs regular heap memory reclamation in addition to optimizing the memory performance of recently discovered delinquent regions using the technique of sliding compaction on those regions—as discussed above. If block 504 determines that garbage collection cannot allocate the missing object, then control is passed to an identify delinquent region block 508, similar to block 310. The block 508 passes control to a memory management/optimization block 510, similar to block 312.

The above techniques are described with reference to optimizing a cache memory. The techniques may be used to optimize any level of memory storage, where a performance monitor measures memory performance. Additionally, the techniques may be used to optimize remotely stored memory devices, such as peripheral devices, or memory devices in a network or server application.

Although certain apparatus and techniques constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What we claim is:

1. An article comprising a machine-accessible medium having stored thereon instructions that, when executed by a machine, cause the machine to:
    obtain, from a performance monitor, performance data for a memory heap having a plurality of memory regions;
    based on the performance data, determine if at least one of the plurality memory regions is a delinquent region, wherein said determining includes instructions that when executed cause the machine to count the number of occurrences of the performance data and to compare the count of the number of occurrences of the performance data to a threshold value, wherein if the count has reached the threshold value a delinquent region is determined to exist, wherein the performance data represents at least one memory performance event;
    in response to a determination that at least one of the plurality of memory regions is a delinquent region, execute a memory management routine to optimize that region of the memory heap by executing a garbage collection routine on at least one delinquent region, the garbage collection routine re-arranging the plurality of memory regions stored in the memory heap to optimize the memory heap; and
    execute a secondary memory management routine on at least one non-delinquent region, wherein the secondary memory management routine is different than the memory management routine.

2. The article of claim 1, wherein the performance data is selected from the group consisting of cache misses, translation lookaside buffer misses, branch mis-predicts, stalls due to data dependency, and data cache write-back.

3. The article of claim 1, wherein the performance monitor is a Performance Monitoring Unit (PMU) of a central processor for the machine.

4. The article of claim 1, wherein the garbage collection routine is selected from the group consisting of reference counting collection, copy collection, generational collection, mark-sweep collection, beltway collection, oldest first collection, slide compaction or a hybrid collection.

5. The article of claim 1, having further instructions that, when executed by the machine, cause the machine to:
    establish a size granularity of the memory region prior to obtaining the performance data for the memory region.

6. The article of claim 1, having further instructions that when executed by the machine, cause the machine to:
    determine if a sufficient number of data samples have been taken, before comparing the count to the threshold value.

7. The article of claim 1, having further instructions that, when executed by the machine, cause the machine to:
    in response to a determination that an additional data sample is to be taken, collect the additional data sample from the memory heap.

8. The article of claim 1, having further instructions that, when executed by the machine, cause the machine to:
    block the delinquent region from memory storage.

9. A method comprising:
    within a central processor for a machine, identifying load miss memory addresses from a memory heap including a plurality of memory regions;

maintaining a frequency count for the identified load miss memory addresses;

determining if the frequency count or percentage of the load miss memory addresses for any of the plurality of memory regions has reached a threshold value of load miss memory addresses;

optimizing the memory heap in response to a determination that at least one of the plurality of memory regions includes a threshold value of load miss memory addresses, wherein optimizing the memory heap comprises performing a first garbage collection routine on at least one of the memory regions including the threshold value of load miss memory addresses and performing a second garbage collection routine, different than the first garbage collection routine, on at least one memory region that does not include the threshold value of load miss memory addresses.

10. The method of claim 9, wherein the first and second garbage collection routines are selected from the group consisting of reference counting collection, copy collection, generational collection, mark-sweep collection, beltway collection, oldest first collection, slide compaction or a hybrid collection.

11. A system comprising:

hardware to monitor performance of a memory heap and to compile performance data on memory regions within the memory heap, wherein the hardware is able to determine if any of the memory regions are delinquent regions based on the compiled performance data and wherein the hardware has a memory manager for optimizing the delinquent regions by re-arranging memory regions in the memory heap in response to a determination of at least one delinquent memory region, wherein a delinquent memory region is one that has at least a threshold number of occurrences of a memory performance event, and a non-delinquent region is one that has less than a threshold number of occurrences of a memory performance event; and the memory manager in the form of a garbage collector for optimizing the delinquent regions using a first garbage collection routine and for optimizing non-delinquent regions using a second garbage collection routine different than the first garbage collection routine.

12. The system of claim 11, wherein the hardware comprises a performance monitoring unit.

13. The system of claim 11, wherein the garbage collector executes a garbage collection optimization selected from the group consisting of reference counting collection, copy collection, generational collection, mark-sweep collection, beltway collection, oldest first collection, slide compaction or a hybrid collection.

* * * * *